Figure 1:
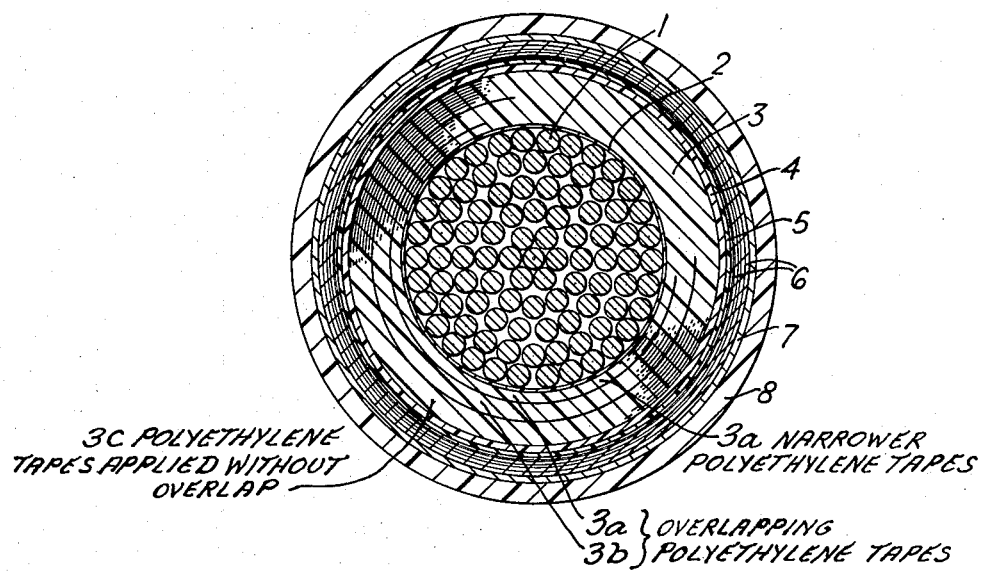

Aug. 11, 1964    E. L. DAVEY    3,144,499
INSULATING STRUCTURE FOR HIGH VOLTAGE POWER CABLES
Filed Nov. 24, 1961    3 Sheets-Sheet 1

3C POLYETHYLENE TAPES APPLIED WITHOUT OVERLAP
3a NARROWER POLYETHYLENE TAPES
3a ) OVERLAPPING
3b ) POLYETHYLENE TAPES

Inventor
Edward Leslie Davey
By
Watt, Mackey + Burden
Attorney

United States Patent Office 3,144,499
Patented Aug. 11, 1964

3,144,499
INSULATING STRUCTURE FOR HIGH VOLTAGE
POWER CABLES
Edward Leslie Davey, Hale, Cheshire, England, assignor
to British Insulated Callender's (Submarine Cables)
Limited
Filed Nov. 24, 1961, Ser. No. 155,252
Claims priority, application Great Britain Dec. 6, 1960
30 Claims. (Cl. 174—25)

This invention relates to high voltage power cables of the kind in which the conductor, or, in the case of a multicore cable, each conductor, is insulated by an intersticed body of dielectric which is built up of helical lappings of insulating tape and which under operating conditions is charged with gas under superatmospheric pressure. Hitherto such cables have either been drawn into metal pipe lines or, more usually, have been provided with gas-impervious metal sheaths which are either intrinsically capable of, or are reinforced so as to become capable of, sustaining the pressures exerted by the gas with which the cables are charged.

By the present invention we provide an improved and cheaper form of gas-filled high voltage power cable which permits of the usual metal sheath and its alternative, the metal pipe line, being dispensed with. Our invention resides in a structure cable of being charged with gas under superatmospheric pressure and, having been so charged, of operating as a sheathless gas-filled high voltage power cable, the structure comprising at least one conductor having a flexible effective surface of a smooth non-re-entrant form on which is built up a dielectric wall which consists entirely or almost entirely of layers of helical lappings of strips of plastics film and directly surrounding this wall at least one layer of helically applied metal tape capable of reinforcing the wall against the internal pressure exerted upon it when the structure is charged with gas to render the structure operational as a gas-filled high voltage cable. By a "sheathless" cable we mean a cable without a gas-impervious metal sheath. By "directly" surrounding the dielectric wall we mean surrounding the dielectric wall without the interpolation of a gas-impervious metal sheath between the dielectric wall and the reinforcing layer or layers of helically applied metal tape but we do not mean to imply that the reinforcing layer is in contact with the dielectric: it may be separated from it by an electrically conductive screening layer.

Under operating conditions of our improved form of gas-filled cable as so far described there will a slow leakage of gas from the structure through the reinforcement layer or layers thereof. Where it is required to reduce such leakage to a minimum the, or each, insulated conductor may be surrounded by a substantially gas-impervious envelope of plastics material. Alternatively, in the case of a multi-core cable structure, the several insulated conductors may be collectively surrounded by such an envelope. The, or each substantially gas-impervious envelope of plastics material may be applied to its insulated conductor, or to the group of conductors, by extrusion or it may be formed by building up a tubular wall of helically lapped tapes of plastics material and then consolidating them by heat and/or pressure. In the latter case where the insulated conductor or each insulated conductor is provided with its own envelope the envelope may be formed by consolidating an outer part of the previously built up dielectric wall. In other cases where the envelope is of insulating material it may augment the previously built-up insulation with the result that the dielectric wall of the complete structure will consist mainly of a gas-pervious annular body of helical lappings of strips of plastics film and an outer part of relatively small radial thickness which is relatively impervious to gas.

A dielectric screen may be provided. Where the envelope for reducing escape of gas is of insulating material and is applied to the insulated conductor of a single core cable or to an individual insulated conductor of a multicore cable, such a screen is preferably applied over the envelope; in other cases directly over the dielectric wall. Alternatively, the envelope may be of conductive material and itself form a screen for the conductor which it encloses.

Figure 3:
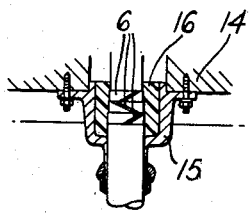
Figure 2:
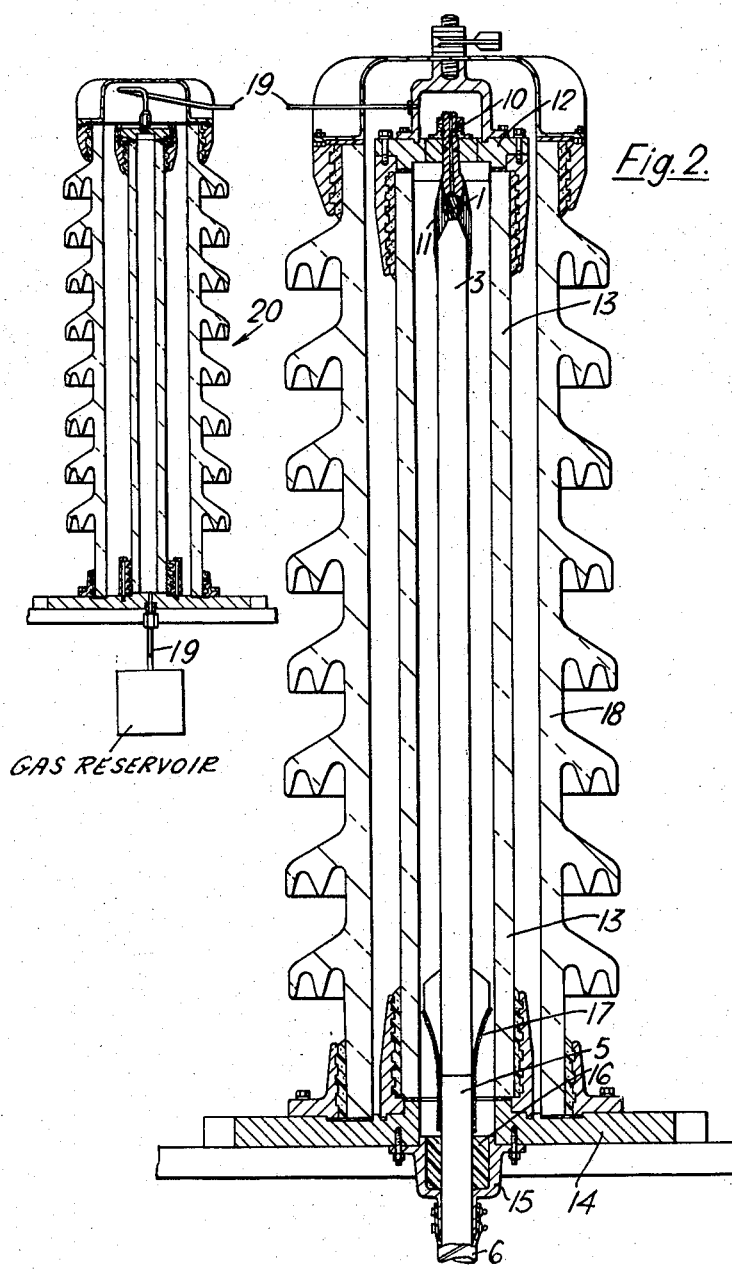
Figure 4:
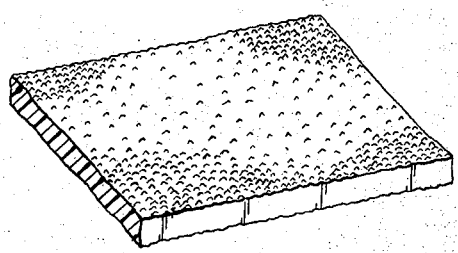
Figure 5:
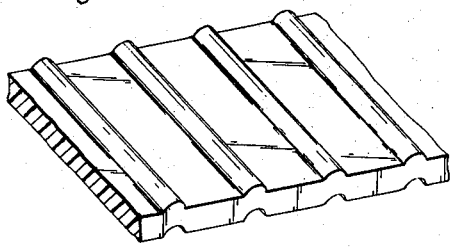
Figure 6:
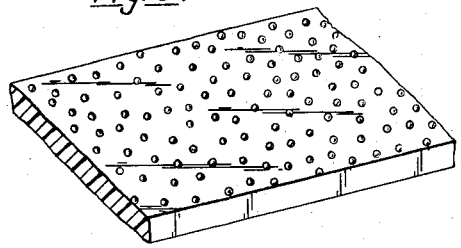

To enable the invention to be more fully understood and readily put into practice, an example of our novel form of a single core gas-filled high tension power cable, designed to operate at a line voltage of 132 kv., and terminating means therefor will be described with reference to the accompanying drawings in which:

FIGURE 1 is a cross-section of the cable,
FIGURE 2 is a vertical section of a cable termination,
FIGURE 3 is a modified detail of FIGURE 2,
FIGURE 4 is an isometric view of a roughened dielectric tape for use in the manufacture of the cable,
FIGURE 5 is an isometric view of a dielectric tape, for use in the manufacture of the cable, which has been serrated on a Schreiner machine, and
FIGURE 6 is an isometric view of a dielectric tape, for use in the manufacture of the cable, which has been dusted with an insulating powder.

The conductor of our improved cable may be a stranded conductor which may or may not be of the hollow core type in which the component round or profiled wires are laid up helically together in such a way as to leave a longitudinally extending passage through the conductor. Alternatively, it may in some cases consist of a metal tube, for instance of copper or aluminium, the wall of which has numerous perforations of small diameter to allow passage of gas and the outer surface of which may have shallow longitudinally and/or helically extending grooves, or it may be a solid conductor of which the surface is either smooth and of non-re-entrant form or is furnished with one or more longitudinally extending and/or one or more helically extending shallow grooves. The conductor, whatever its form, may be given a flexible effective surface that is smooth and of non-re-entrant form by applying to it a flexible electrically conductive screen of metallic material or of electrically conductive non-metallic material. Application may be by extrusion or the screen may be built up of tapes lapped helically on the conductor, the outermost of these tapes preferably being no thicker than the tapes of which the inner part of the dielectric is built up and preferably being applied with overlap for reasons which will appear later.

The use of a conductor having a grooved or beaded surface in conjunction with a flexible and elastic conductor screen may be advantageous in that it results in space in which to some extent the increase in volume of the plastics dielectric that takes place when the cable is put on load can be accommodated. The accommodation volume so provided is in the case of a stranded conductor of which the outer layer is formed of wires of circular cross-section, proportional to the overall diameter of the conductor and also to the diameter of the individual wires. Consequently in cases where such accommodation volume is required to be as high as is practicable we prefer not to use died down strand or strand made of wires of such small diameter that the peripheral surface of the conductor becomes of little use from the point of view of providing expansion accommodation volume.

For building up the dielectric body it is desirable to use tapes of thermoplastic material which will not weld together under pressure at the maximum conductor operating temperature of the cable, which at present is preferably about 70° C. If such tapes are to be used to form an envelope for reducing gas leakage they should be of a material which is such that they will consolidate, that is to say, soften and weld together to an extent to convert a plurality of superposed helical lappings thereof into a water-tight tubular wall, at a temperature substantially above the maximum conductor operating temperature. The material of the tapes should also preferably have a low specific inductive capacity. It is preferable to use tapes of a material that, in addition to a low specific inductive capacity, also has a low dielectric loss angle and a high dielectric strength. It should, of course, have sufficient tensile strength to permit of tapes of the material being lapped on to the conductor. A material satisfying all these requirements and preferences is polyethylene, which expression includes compositions consisting of solid polymers of ethylene and/or solid co-polymers of ethylene and other olefines, whether produced by a high or low pressure process and with or without the addition of dyes, pigments, oxidation inhibitors, mineral fillers and/or other high molecular weight polymeric materials, for example polyisobutylene, in such proportions as do not reduce to any important extent the aforesaid characteristics.

The radial thickness of the gas-leak reducing envelope, whether formed by consolidating a wall of insulating and/or conducting helically applied tapes, or by extrusion, is limited to ensure that after allowing for the effect of residual tensile stress in the envelope, the pressure at the envelope/reinforcement interface is high enough to keep the pressure difference across the wall of the envelope and the resulting permeation of gas through that wall to a low value and, where the envelope forms a part of the dielectric to permit the envelope to be electrically stressed to the desired extent. A wall thickness of between 20 mils and 50 mils is preferred, the lower end of the thickness range being used in the case of cables whose core diameter is at the lower end of the range of core diameters for gas-filled super-tension cables and the upper end of the thickness range being used in the case of cables having a core diameter at the upper end of the range. By "core diameter" is meant the diameter measured across the insulating conductor and the screen surrounding the conductor dielectric. For example, in the case of a cable having a consolidated taped or extruded insulating envelope of 1.5" diameter and 0.020" wall thickness the pressure drop between the inside and outside of the wall of the envelope required to ensure the intimate contact with the screen and that of the screen with the reinforcement may be about 15 lbs. per square inch gauge pressure. Thus if the gas pressure in the conductor and unconsolidated part of the dielectric is 300 lbs. per square inch gauge pressure the pressure at the outside of the envelope will be 285 lbs. per square inch gauge pressure which is high enough to ensure that the envelope can be electrically stressed to the same extent as the outer part of the unconsolidated part of the dielectric. Consolidation to the required radial depth may be effected by heating the insulated conductor from the outside, for instance by radiant heat, by hot air blast, or by passing it longitudinally through an elongated treatment chamber containing low pressure steam, e.g. steam at a pressure of 20 lbs. per square inch and a temperature of 120° C. in the case of polyethylene having a melting point of about 110° C.

The dielectric may be built up entirely, or substantially entirely, of insulating tapes applied helically in layers without overlap between successive turns in each layer, care being taken to avoid superposing of the butt spaces in successive layers. We prefer, however, to apply the insulating tapes used to build at least that part of the dielectric wall that is subjected to the highest electrical stress, i.e. the first few layers of tape to be applied, with overlap between successive turns of each layer. This has the advantage that the helically extending interstices in the part of the dielectric so built up are of small and predetermined volume since their cross-sectional area is (for a given material and neglecting the effect of gas pressure) determined solely by the thickness of the tape—the width of the interstices measured in a direction parallel to the cable axis being constant for a given thickness of tape of a given material applied at a given tensile stress. The electrical stress in the gaps is given by the following formula:

$$Sg = \frac{Ss}{1 + \left(\frac{b(eg-es)}{es(a+b)}\right)}$$

where $Sg$ = the stress in the gas space
$Ss$ = the stress in the solid dielectrci
$eg$ = specific inductive capacity of the gas
$es$ = specific inductive capacity of the solid dielectric
$a$ = thickness of the gas space in the direction of the electric field
$b$ = width of the gas space in a direction at right angles to the electric field It will be seen that since $es$ is greater than $eg$ and hence $$\frac{eg-es}{es}$$

is negative, reducing the ratio of $b$ to $a$ greatly reduces the stress in a gas space of given thickness. Thus by building up the whole or the inner part of the dielectric of layers of helically lapped thin tapes applied with overlapping turns, the interstices cannot exceed a pre-determined size and the stress across them will be less than in the case of interstices in a dielectric built up of layers of similar tapes applied without overlap, since one cannot lap so accurately as to ensure that the width of the butt spaces will never exceed say, twice the thickness of tape used. Moreover, by applying the tapes with overlapping turns the interstices formed are of triangular cross-section with the result that dielectric flux fringing effects will be present which will lower the stress in the space as compared with that in a butt space of rectangular shape and the same radial thickness and the same width.

The tapes may be applied satisfactorily with an overlap of up to 25%. If a greater degree of overlap is used there is risk of the overlap edge of the tape of one layer lying so near the overlapping edge of the tape of the preceding layer as to form between them a helical space having a high ratio of width to thickness. With overlap of more than about 25% there is also a greater risk of the dielectric wall becoming humpy, for the chances of obtaining random positioning of overlaps in successive layers is correspondingly reduced. To reduce these risks as much as is practicable and to maintain a relatively high gas space volume in the dielectric wall we prefer to apply the tapes with an overlap within the range 5% to 7½%. With a nominal overlap of less than about 5% there is considerable risk unless the tapes are lapped with great accuracy of a layer with overlapping turns becoming here and there a layer with butt spaces of indeterminable axial length.

The lower stressed radially outer part of the dielectric wall may also be built up of tapes applied with overlapping turns or it may be built up of tapes applied with gapped turns to provide in this region a greater aggregate volume of interstices than would be obtained by lapping the tapes with overlapping turns. This has the advantage of providing greater gas space volume for thermal expansion of the thermoplastic material.

In the inner and more highly stressed part of the dielectric and increase in the space volume serving to accommodate thermal expansion of the material may be obtained by using in this region narrower tapes than are used for the radially outer region of the dielectric wall, for the ratio of gas space to solid dielectric is for a given percentage overlap proportional to $t/w$ where $t$ is the tape thickness and $w$ the tape width.

In the outer region tapes of greater thickness may be employed than those used to build up the more highly stressed inner region. If desired the thickness of the tapes used may increase step by step as the radius at which they are applied increases and the electrical stress to which they are subjected diminishes.

We may build up the dielectric wall of tapes of varying degrees of softness—using the hardest of the grades for the innermost layers which operate at the highest temperatures and softer and softer grades as the outside of the dielectric wall is approached. The use of the softer grades for the cooler parts, especially consolidated outermost part of the dielectric wall, assists the transmission of gas pressure through such parts of the dielectric to the reinforcing envelope.

Before being put into operation as a sheathless high voltage power cable our improved cable structure is charged with gas at a pressure of from about 200 lbs. to about 600 lbs. per square inch, this gas, which may be nitrogen, sulphur hexafluoride or other suitable gas, being introduced via the conductor or where a solid conductor is used, between the conductor and its screen. On so charging the cable the gas pressure forces the flexible conductor screen into close contact with the internal surface of the dielectric wall and places the wall under a compressive force which is taken up by the helically applied reinforcement tapes. Each of the tapes in the inner unconsolidated part of the dielectric may be applied with minimum tension so as to leave a gas space between radially adjacent tapes. Alternatively, or in addition, each of such tapes may have one or both of its major surfaces roughened as shown in FIGURE 4 or dimpled or serrated on a Schreiner machine in a direction transverse to the length of the tape as shown in FIGURE 5 to allow gas to penetrate more easily between contiguous tapes and between the overlapped parts of successive turns of each tape. Alternatively, the tapes may be dusted with a non-hygroscopic insulating powder, for example, mica dust or powdered glass as shown in FIGURE 6.

Where the outer part of the lapped dielectric is consolidated to form a gas-leak reducing envelope we prefer to apply to the exposed surface of such envelope a dielectric screen of thin flexible tape of copper or other electrically conductive material, for example conductive polyethylene applied with overlapping turns. We also prefer to apply a screen of this nature in cases where the envelope is applied by extrusion. We also prefer to apply such a screen in cases where the envelope is of a conductive plastics material.

The nature of the layer or layers of helically applied tape serving to reinforce the outer part of the dielectric wall and, when present, the substantially gas-impervious envelope, against the internal pressure exerted on it by the gas, will depend upon the gas pressure to be employed, the external diameter of the screened core to be reinforced, the electrical conductivity required and upon whether the cable is designed for A.C. or D.C. transmission. In general we prefer to use a plurality of layers of thin tapes of aluminium and/or aluminium alloy or of tinned bronze or hardened copper applied with either gapped or overlapping turns but for cables for transmission of direct current we may use thin steel tapes and for alternating current cables thin tapes of nonmagnetic steel. We prefer to use a minimum of four layers of tapes. In the case of an unarmoured cable, successive layers are applied of opposite hand, each layer being applied with a gap between successive turns and at the critical angle of lay for such a cable, namely an angle of 54°, but in the case of an armoured cable all reinforcement tapes are preferably of one and the same hand and the armouring wires of opposite hand. The number and thickness of the reinforcement tapes will be such as to provide an envelope that will withstand the hoop tension exerted in it by maximum gas pressure to be employed and will cater for the short circuit current in the event of a fault so effectively that the conductor temperature will not rise to a value that would be harmful to the dielectric. To this end we may for example, use a reinforcement consisting of a combination of tapes of pure aluminium and tapes of an aluminium base alloy of high tensile strength.

In order to avoid excessive gas pressure being developed within the cable owing to the rise in temperature that takes place as the power loading of the cable is increased, provision may be made to allow gas to flow from the conductor through the terminations applied to the ends of the cable and into reservoirs as the cable heats up and to flow in the reverse direction as the load is reduced and the cable temperature falls.

In the case of multicore cable, for example 3-core cable, each conductor is insulated in the same way as has been described in connection with a single core cable and unless the gas-leak reducing envelope is of conductive plastics material, is then electrostatically screened by applying a copper, tin, bronze or aluminum screening tape approximately 3-5 mils thick or a tape of conductive plastics material. The screened cores are then laid up helically together and padded with suitable filler material such as impregnated jute, impregnated paper or the like, to form a circular cable body. An envelope of plastics material is applied either by extrusion or by applying lappings of tape to build up a laminated wall of the required radial thickness which is subsequently consolidated. Over this common envelope is applied the metallic tape reinforcement designed to give the necessary resistance to the pressure exerted upon it and to provide the required short circuit current carrying capacity. With a view to reducing the overall dimensions of this multicore cable the individual cores may be of oval cross-section.

Ambient conditions will usually render it necessary to provide an anti-corrosion sheathing for the reinforcing tapes except possibly where tapes of stainless steel can be used. This may take the form of an extruded sheathing of a rubber or P.V.C. composition or of a polythene composition, with or without an outer covering of textile tapes or it may be formed by applying sulphur dusted rubber tapes, helically or longitudinally, and vulcanising these in situ on the cable.

Where armouring is necessary, we prefer to use aluminum or aluminium base alloy wire for single core A.C. cables but in the case of a 3-core cable we prefer to use steel wires which are either galvanised or individually covered in vulcanised rubber. In such cases the individually reinforced and corrosion protected cores can be laid up and bound together without fillers before the armouring wires are applied.

The cable shown in FIGURE 1 of the accompanying drawing comprises a solid stranded copper conductor 1 of normal construction—that is to say consisting of a central circular wire and five layers of circular wires none of which is compacted or consolidated to reduce the interstices within the conductor or to impart a smoother surface to the outermost layer. Over the conductor is a flexible elastic conductor screen 2 formed by helically applying a 6.5 mil thick tape of conducting polyethylene with 10% overlap between successive turns. On this screened conductor is a wall of dielectric 3 having a radial thickness of 200 mils built up of layers of helically lapped polyethylene tapes of the grade sold by British Visqueen Ltd. under the name "Grade 2 Visqueen," the tapes having a thickness of 2 mils and a width of ⅞" except in the innermost layers (3a) which are of narrower tape (e.g., having a width of ⅝"). The tapes of the outer part (3c) of the dielectric wall 3 are applied without an overlap and the tapes of the inner part (3a and 3b) are applied with a 10% overlap. All of the tapes are applied at a tension of ½ lb., the inner layer registration being approximately 25%. Over this laminated wall of dielectric is extruded a 30 mils thick seamless envelope 4 of polyethylene of the grade sold by Imperial Chemical Industries Ltd. as Grade 2. Over this envelope is a helical lapping of 6.5 mil thick tape of conductive polyethylene applied with a 10% overlap to form a dielectric screen 5. The screened core so described is reinforced against the pressure of gas with which the cable is charged by a reinforcement 6 comprising two layers of helically applied 5 mil thick aluminum tapes, followed by two layers of helically applied 10 mil thick tapes of aluminum alloy, followed by a further two layers of 20 mil thick tapes of the same alloy, the alloy being that known as M 57 SH aluminium alloy described in British Standard 1475:1955 and consisting of:

| | Percent |
|---|---|
| Magnesium | 1.8 to 2.7 |
| Silicon | 0.6 |
| Manganese | 0.5 |
| Chromium | 0.5 |
| Iron | 0.7 |
| Aluminium | The remainder |

Over this reinforcement is lapped a tape of bituminised cotton tape 7 and enclosing this is an extruded seamless anti-corrosition sheathing 8 of polyvinyl chloride composition having a wall thickness of 80 mils. This example of cable is designed to operate at an internal gas pressure of 300 lbs./sq. inch.

Our novel form of gas-filled high tension power cable has several important advantages over existing types of such cable:

It is above all cheaper to manufacture, to transport and to install since it has no metal sheath.

It is smaller in diameter than a gas-filled impregnated paper cable of conventional type designed for the same voltage and current-carrying capacity. This is partly due to the absence of a metal sheath and partly due to the fact that its dielectric wall is thinner and that it has a lower thermal resistivity due in part to the lower thermal resistivity of plastics as compared with paper and in part due to the fact that gas spaces within the dielectric are reduced to a minimum so that heat is transmitted through the dielectric wall more readily, a fact which permits of the conductor being more heavily loaded than a similar conductor of a conventional gas-filled impregnated paper cable.

The cable can be manufactured in indefinitely long lengths as a continuous operation.

There is no need to build up the dielectric wall in an air-conditioned atmosphere, as is advisable in the case of the conventional super tension cable, to reduce moisture absorption, especially during stoppages for reloading the lapping head.

The gas volume in the dielectric can be predetermined to allow for the expanded dielectric completely filling the space between the conductor and the reinforcement when the cable reaches normal operating temperature.

Jointing of our sheathless gas-filled super-tension cable is very simple as compared with the jointing of a gas-filled super tension cable of conventional form. In the case of a cable having a stranded or tubular conductor it simply consists in joining the conductors together with a ferrule having a gas passage through it and then insulating this conductor joint by means of plastics tapes or injection moulded plastics material and afterwards restoring and jointing firstly the dielectric screening tapes and secondly the reinforcing tapes and their protective coverings. There is no need to enclose this cable joint in an outer joint box. In the case of cable having a solid conductor having a grooved surface it is preferable to employ a ferrule having a grooved surface and to insulate by means of plastics tapes rather than by a moulding operation.

The cable may be terminated as shown for example in FIGURE 2 of the drawings by connecting the exposed end of the cable conductor 1 to an imperforate walled tubular conductor 10 and applying a poultice 11 of moulded or lapped insulation which extends over the tapered end of the cable insulation 3 and over the adjoining end of the tubular conductor 10 which is anchored to and passes through the "upper" end wall 12 of a tubular porcelain insulator 13, the lower end of which is mounted on a base 14 carrying a gland 15 at which the reinforcing tapes 6 are terminated either by mechanically clamping them to the gland 15 as shown or by embedding them, as shown in FIGURE 3, in a cast resin moulding 16 cast in the gland 15 and serving to form a gas-tight seal between the cable and the gland wall. The dielectric screen 5 is continued beyond the gland 15 and is terminated at a stress cone 17 built up on or moulded around the cable core at the lower end of the tubular insulator 13. The tubular insulator 13 may be enclosed within an outer shedded insulator 18 of porcelain. To compensate for the removal of the reinforcing tapes 6, the interior of the inner insulator 13 is filled with liquid insulating compound maintained under the same gas pressure as that at which gas is fed to the cable through the tubular stem 10 passing through the upper end wall of the insulator. Gas may be fed to the sealing end via a feed pipe 19 of insulating material or by means of a second sealing end 20 serving simply as an insulator in the gas feed line 19 to the cable sealing end. If, as has been previously mentioned, a reservoir is provided, it may be inserted in the feed pipe 19 or be coupled to the low voltage side of the second sealing end 20.

What I claim as my invention is:

1. A structure capable of being charged with gas under superatmospheric pressure and, having been so charged, of operating as a sheathless gas-filled high voltage power cable, the structure comprising at least one conductor having a flexible effective surface of a smooth, non-re-entrant form, a dielectric wall built up on said conductor and consisting essentially of layers of helical lappings of tapes of plastics film, and surrounding this wall at least one layer of helically applied metal tape capable of reinforcing the wall against the internal pressure exerted upon it when the structure is charged with gas to render the structure operational as a gas-filled high voltage cable, narrower tapes of plastics film being used in the region of the dielectric wall adjacent the conductor and successive turns of the tapes of each layer of the inner part of the wall overlapping each other and successive turns of the tapes of each layer of the outer part of the wall being separated by a gap, whereby the gas spaces in the wall are of a predetermined shape and dimensions such that ionization of gas in said spaces is inhibited and their total volume is such that at the normal operating temperature and pressure of the cable they accommodate the thermal expansion of the solid dielectric material of the wall.

2. A sheathless gas-filled high voltage power cable comprising a structure as claimed in claim 1 charged with gas under super-atmospheric pressure.

3. A structure as claimed in claim 1, wherein the flexible effective surface that is smooth and of non-re-entrant form comprises a flexible electrically conductive screen of metallic material surrounding the conductor, said screen being built up of at least two layers of helical lappings of metal tapes of which the outermost is of a thickness not exceeding that of the plastics film of which the innermost part of the dielectric wall is built up, and is applied with overlapping turns.

4. A structure as claimed in claim 1, wherein the flexible effective surface that is smooth and of non-re-entrant form comprises a flexible electrically conductive screen of metallic material surrounding the conductor, said screen being built up of a single helically lapped tape which is of a thickness not exceeding that of the plastics film of which the inner part of the dielectric wall is built up, and the successive turns of which overlap one another.

5. A structure as claimed in claim 1, wherein the overlap between successive turns of the same layer does not exceed 25% of the strip width.

6. A structure as claimed in claim 1, wherein the overlap between successive turns of the same layer is from 5% to 7½% of the width of the strip.

7. A structure as claimed in claim 1, wherein an outer part of the dielectric wall is build up of layers of helical lappings of tapes of plastics film of a softer grade than that of which an inner part of the dielectric wall is built up.

8. A structure as claimed in claim 1, wherein the dielectric wall consists essentially of layers of helical lappings of tapes of plastics film which is thermoplastic but which has physical characteristics at the maximum conductor operating temperature of the cable such that the tapes will not weld together.

9. A structure as claimed in claim 8, wherein at least the outer part of the dielectric wall is built up of a number of superposed helical lappings of strips of plastics film which will soften and weld together to an extent to convert them into a substantially gas-impervious envelope at a temperature substantially above the maximum conductor operating temperature.

10. A structure as claimed in claim 8, wherein the plastics film is of polyethylene.

11. A structure as claimed in claim 1, wherein the dielectric wall is built up at least in part of tapes of film having at least one of its major surfaces roughened for the purpose of allowing gas to penetrate more easily between contiguous tapes and between the overlapped parts of successive turns of each tape.

12. A structure as claimed in claim 1, wherein the dielectric wall is built up at least in part of tapes of film having at least one of its major surfaces serrated in a direction transverse to the length of the tapes for the purpose of allowing gas to penetrate more easily between contiguous tapes and between the overlapped parts of successive turns of each tape.

13. A structure as claimed in claim 1, wherein the dielectric wall is built up at least in part of tapes of film, at least one surface of which has a dusting of a non-hygroscopic insulating powder.

14. A structure as claimed in claim 1, having only one conductor, wherein the reinforcement for the dielectric wall comprises at least four metal tapes applied helically all in the same helical direction and each with a gap between successive turns and wherein armouring wires extend helically around the said reinforcement in a direction of opposite hand to the direction of lay of the reinforcement tapes.

15. A structure as claimed in claim 1, wherein the reinforcement tapes are collectively enclosed in a corrosion protective sheath.

16. A structure capable of being charged with gas under superatmospheric pressure and, having been so charged, of operating as a sheathless gas-filled high voltage power cable, the structure comprising at least one conductor having a flexible effective surface of a smooth non-re-entrant form, a dielectric wall surrounding said conductor and consisting essentially of layers of helical lappings of tapes of plastics film, a dielectric screen surrounding the dielectrical wall and directly surrounding the screen, at least one layer of helically applied metal tape capable of reinforcing the screened dielectric wall against the internal pressure exerted upon it when the structure is charged with gas to render the structure operational as a gas-filled high voltage power cable, narrower tapes of plastics film being used in the region of the dielectric wall adjacent the conductor and successive turns of the tapes of each layer of the inner part of the wall overlapping each other and successive turns of the tapes of each layer of the outer part of the wall being separated by a gap, whereby the gas spaces in the wall are of a predetermined shape and dimensions such that ionization of gas in said spaces is inhibited and their total volume is such that at the normal operating temperature and pressure of the cable they accommodate the thermal expansion of the solid dielectric material of the wall.

17. A sheathless gas-filled high voltage power cable comprising a structure as claimed in claim 16 charged with gas under super-atmospheric pressure.

18. A structure as claimed in claim 16, wherein the dielectric screen comprises at least one layer of helical lappings of flexible copper tape.

19. A structure as claimed in claim 16, wherein the dielectric screen comprises a helical lapping of tape of conducitve polyethylene applied with overlapping turns.

20. A structure as claimed in claim 16, wherein the dielectric screen is applied over a substantially gas-impervious envelope enclosing the insulated conductor, and beneath the layers of helically applied metal tape capable of reinforcing the screened dielectric wall against the internal pressure exerted upon it when the structure is charged with gas to render the structure operational as a gas-filled high voltage power cable.

21. A structure as claimed in claim 16 wherein an outer part of the dielectric wall is built up of layers of helical lappings of tapes of plastics film of a softer grade than that of which an outer part of the dielectric wall is built up.

22. A structure capable of being charged with gas under superatmospheric pressure and, having been so charged, of operating as a sheathless gas-filled high voltage power cable, the structure comprising at least one conductor having a flexible effective surface of a smooth non-re-entrant form, a dielectric wall surrounding said conductor and consisting essentially of layers of helical lappings of tapes of plastics film, a substantially gas-impervious envelope of plastics material surrounding the said wall and at least one layer of helically applied metal tape surrounding the envelope and capable of reinforcing it against the internal pressure exerted upon it when the structure is charged with gas to render the structure operational as a gas-filled high voltage cable, narrower tapes of plastics film being used in the region of the dielectric wall adjacent the conductor and successive turns of the tapes of each layer of the inner part of the wall overlapping each other and successive turns of the tapes of each layer of the outer part of the wall being separated by a gap, whereby the gas spaces in the wall are of a predetermined shape and dimensions such that ionization of gas in said spaces is inhibited and their total volume is such that the normal operating temperature and pressure of the cable they accommodate the thermal expansion of the solid dielectric material of the wall.

23. A sheathless gas-filled high voltage power cable comprising a structure as claimed in claim 22 charged with gas under super-atmospheric pressure.

24. A structure as claimed in claim 22, wherein the substantially gas-impervious envelope of plastics material is a seamless tube of thermoplastic insulating material.

25. A structure as claimed in claim 22, wherein the substantially gas-impervious envelope of plastics material is a seamless tube of thermoplastic electrically conductive material.

26. A structure as claimed in claim 22, wherein the substantially gas-impervious envelope is a consolidated multi-layer body each layer of which consists of a lapping of a strip of film of a thermoplastic material having a softening and welding temperature substantially above the conductor operating temperature.

27. A structure as claimed in claim 26, wherein the substantially gas-impervious envelope is a consolidated outer part of the dielectric wall.

28. A structure as claimed in claim 26, wherein the substantially gas-impervious envelope has a radial wall thickness of from 20 to 50 mils such that when the structure is charged with gas under superatmospheric pressure, the pressure at the envelope/reinforcement interface is high enough to keep the pressure difference across the wall down to a relatively low value and the resulting permeation of gas through the wall to a small value.

29. A structure as claimed in claim 26, wherein the tapes of plastics film of which the substantially gas-impervious envelope is formed are applied with greater tension than are the tapes of film of which the dielectric wall contained by the said envelope is built up.

30. A structure as claimed in claim 22 wherein an outer part of the dielectric wall is built up of layers of helical lappings of tapes of plastics film of a softer grade than that of which an outer part of the dielectric wall is built up.

References Cited in the file of this patent

UNITED STATES PATENTS

| | | |
|---|---|---|
| 1,770,851 | Hayman | July 15, 1930 |
| 1,770,877 | Clark | July 15, 1930 |
| 2,196,026 | Piercy | Apr. 2, 1940 |
| 2,304,210 | Scott et al. | Dec. 8, 1942 |
| 2,754,352 | Connell | July 10, 1956 |
| 2,834,828 | Ebel | May 13, 1958 |

FOREIGN PATENTS

| | | |
|---|---|---|
| 553,716 | Great Britain | June 2, 1943 |
| 852,370 | Great Britain | Oct. 26, 1960 |

UNITED STATES PATENT OFFICE
CERTIFICATE OF CORRECTION

Patent No. 3,144,499                                               August 11, 1964

Edward Leslie Davey

It is hereby certified that error appears in the above numbered patent requiring correction and that the said Letters Patent should read as corrected below.

Column 1, line 27, for "cable" read -- capable --; line 50, after "will" insert -- be --; column 4, line 18, for "dielectrci" read -- dielectric --; line 73, for "and" read -- an --; column 5, line 16, after "especially" insert -- the --; column 6, line 56, for "drawing" read -- drawings --; column 7, line 26, for "anti-corrosition" read -- anti-corrosion --; column 9, line 63, for "dielectrical" read -- dielectric --; column 10, line 13, for "conducitve" read -- conductive --; line 25, for "outer" read -- inner --; line 49, after "that" insert -- at --; column 11, line 12, for "outer" read -- inner --.

Signed and sealed this 24th day of November 1964.

(SEAL)
Attest:

ERNEST W. SWIDER                                   EDWARD J. BRENNER
Attesting Officer                                 Commissioner of Patents